United States Patent
F'Geppert

[11] 3,913,713
[45] Oct. 21, 1975

[54] TEMPERATURE RESPONSIVE DRIVE UNIT
[75] Inventor: Erwin F'Geppert, Novi, Mich.
[73] Assignee: The United States of America as represented by the Secretary of the Army, Washington, D.C.
[22] Filed: Jan. 4, 1974
[21] Appl. No.: 430,961

[52] U.S. Cl............ 192/70.25; 64/30 C; 192/82 T; 192/89 B; 192/111 B
[51] Int. Cl.² .................................. F16D 43/25
[58] Field of Search ............ 192/70.25, 82 T, 89 B, 192/111 B; 64/30 R, 30 C; 236/101 B

[56] References Cited
UNITED STATES PATENTS

| | | | |
|---|---|---|---|
| 1,233,518 | 7/1917 | Snyder | 192/82 T |
| 2,727,372 | 12/1955 | Haerther | 64/30 C |
| 2,840,316 | 6/1958 | Herbenar | 192/82 T |
| 3,075,691 | 1/1963 | Kelley | 192/82 T |
| 3,189,277 | 6/1965 | Fox | 236/101 B |
| 3,261,230 | 7/1966 | Rudnicki | 192/82 T |
| 3,726,109 | 4/1973 | Mortensen | 64/30 C |
| 3,730,151 | 4/1971 | Smith et al. | 192/82 T |

Primary Examiner—Allan D. Herrmann
Attorney, Agent, or Firm—John E. McRae; Peter A. Taucher; Robert P. Gibson

[57] ABSTRACT

A temperature responsive drive unit comprising clutch plates keyed to the drive and driven members. A thermal power means is carried by one of the members to force the clutch plates together as the ambient temperature is increased beyond a specified value. The invention is especially applicable for transmitting power to the cooling fan of an internal combustion engine. At low engine temperatures the clutch plates are substantially disengaged, and the fan remains essentially motionless. As the engine heats up the thermal power means moves the clutch plates together to thereby rotate the fan at sufficient speed to adequately cool the engine or its radiator.

6 Claims, 4 Drawing Figures

TEMPERATURE RESPONSIVE DRIVE UNIT

The invention described herein may be manufactured, used, and licensed by or for the Government for governmental purposes without payment to me of any royalty thereon.

BACKGROUND OF THE INVENTION

U.S. Pat. No. 3,096,828 issued to P. Hollingsworth on July 9, 1963 shows an engine cooling propeller fan having a thermal power means arranged between the fan hub and each fan blade to twist the blade around its axis and thereby change the pitch of the blade in response to ambient temperature changes. At low temperatures the blade pitch is low, and the fan moves little or no air over the engine or its radiator. At higher temperatures the blade pitch is increased, and the fan therefore moves increased quantities of air.

U.S. Pat. No. 1,233,518 issued to P. T. Snyder on July 17, 1917 shows an engine cooling propeller fan having a thermal power means responsive to ambient temperature change to vary the driving power from a drive pulley to the hub of the fan. At low ambient temperatures the transmitted drive is minimal, and the fan moves at low speed. At high ambient temperatures the thermal power means expands along the fan axis to energize a friction clutch located between the drive pulley and fan hub, whereby the fan is caused to move at a sufficient speed to cool the engine or its radiator.

THE PRESENT INVENTION

The present invention is directed to improvements in the type of drive unit shown in U.S. Pat. No. 1,233,518. An object of the invention is to provide a temperature responsive drive unit that is relatively compact in the axial and radial directions, to thereby fit into small clearance areas without projecting into the air stream generated by the fan. Another object is to utilize bimetal power means that achieves high power without the "leakage" disadvantages of wax-charged power elements. A further object is to provide a drive unit having widely spaced bearings for the drive and driven members, thereby effectively minimizing load forces that can be present with long cantilever type hub-bearing arrangements. An additional object is to provide a drive unit wherein the power means exerts a progressively increased actuator force over a relatively large temperature range, thereby enabling the fan to gradually pick up speed without shock or abrupt load changes on the drive unit parts.

THE DRAWINGS

Figure 1:
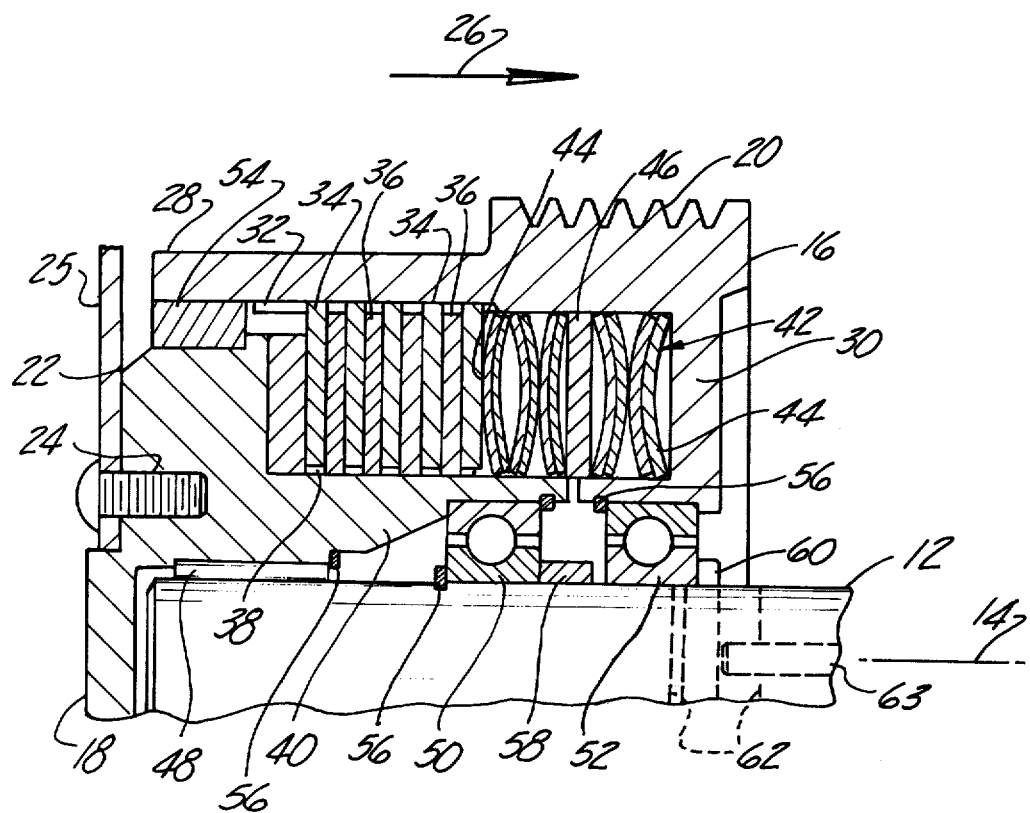
FIG. 1 is a fragmentary sectional view taken through a preferred embodiment of the invention.

FIG. 1 shows a temperature responsive drive unit 10 comprising a stationary shaft 12 suitably mounted on the forward portion of an engine block, not shown. The unit is symmetrical about shaft axis 14; therefore only one half of the unit is illustrated.

Shaft 12 acts as a support means for a rotary drive hub 16 and rotary driven hub 18. Power for hub 16 is derived from an engine-driven belt means trained around pulley surfaces 20. An internal clutch means interposed between hubs 16 and 18 transmits power from hub 16 to hub 18. The forward end face 22 of hub 18 is formed with a number of bolt holes 24 for mounting the central disk portion 25 of a conventional propeller fan. When the fan is up to speed it draws air through a conventional radiator for the engine coolant in the usual fashion; the direction of air flow is designated by numeral 26.

Drive hub 16 comprises an outer annular peripheral side wall 28 and an inwardly radiating end wall 30. Splines 32 are formed on the inner surface of wall 28 to key into slots formed on the outer peripheral edges of clutch plates 34. The interposed clutch plates 36 are keyed onto splines 38 formed on the inner peripheral wall 40 of the driven hub 18. A thermal power means, designated generally by numeral 42, acts axially between the end wall 30 of drive hub 16 and the stack of clutch plates to apply pressure to the plates, thereby enabling the plates to frictionally transmit a rotary drive from hub 16 to hub 18. The thermal power means is preferably designed to apply a graduated axial force over a relatively wide temperature range so that plates 36 gradually come up to the speed of plates 34. Such an arrangement minimizes shock loadings and thereby prolongs service life. Additionally, the arrangement enables the fan speed to maintain a rough proportionality to the coolant radiator demand. The overall purpose of the variable speed drive unit is of course to minimize excessive fan noise and power consumption when the engine is idling, or the ambient temperatures are such that high fan speeds are unnecessary or objectionable.

The thermal power means 42 shown in FIG. 1 comprises ten radially oriented bimetal rings or plates 44 interposed between hub end wall 30 and the rightmost clutch plate 34. Bimetal plates 44 are arranged in two groups on either side of a force-transmitting disk 46. The bimetal plates are preferably annular plates centered around shaft axis 14.

FIG. 1 illustrates in an exaggerated fashion the curvatures taken by the bimetal plates when exposed to high temperatures; the actual curvature would be somewhat less than that shown in FIG. 1. At low ambient temperatures bimetal plates 44 may be essentially flat. As the ambient temperature is increased the walls of hub 16 heat the bimetal plates; the high expansion lamination or surface of each plate assumes a slightly convex configuration, and the low expansion lamination or surface assumes a slightly concave configuration, as depicted in exaggerated fashion in FIG. 1. The stack of plates thereby applies an axial engagement force on the clutch plates 34 and 36.

The bimetal plates may be arranged so that certain ones of the plates have their high expansion surfaces facing one end of the drive unit, and other ones of the plates have their high expansion surfaces facing the other end of the drive unit. FIG. 1 shows the plates arranged in five groups, two plates in each group. Plates stacked with their corresponding surfaces facing the same direction will have relatively small deflection movements and magnified deflection forces. Plates stacked in "opposed" relation, i.e. with corresponding surfaces facing in opposite directions, will have magnified deflection movements and relatively small deflection forces. The plates can be arranged in various numbers and groups to provide the desired combination of force and deflection. The temperature range through which the deflection is achieved can be controlled or varied by selecting different bimetal combinations (different materials or lamination thicknesses) such that different bimetals operate in different narrow ranges.

Bimetal operators of the type shown in FIG. 1 are believed advantageous over conventional wax-charged elements in that there are no leakage problems and relatively few calibration problems. Bimetals are springs; hence they do not require the override protection necessary with wax-charged elements. Additionally, by using the bimetals in stacks it is probably possible to apply a graduated clutch engagement force over a wider temperature range than wax-charged elements; such wax-charged elements often have effective wax expansions over relatively narrow temperature spans so that the clutch engagement is probably somewhat more abrupt and shock-like.

Figure 2:
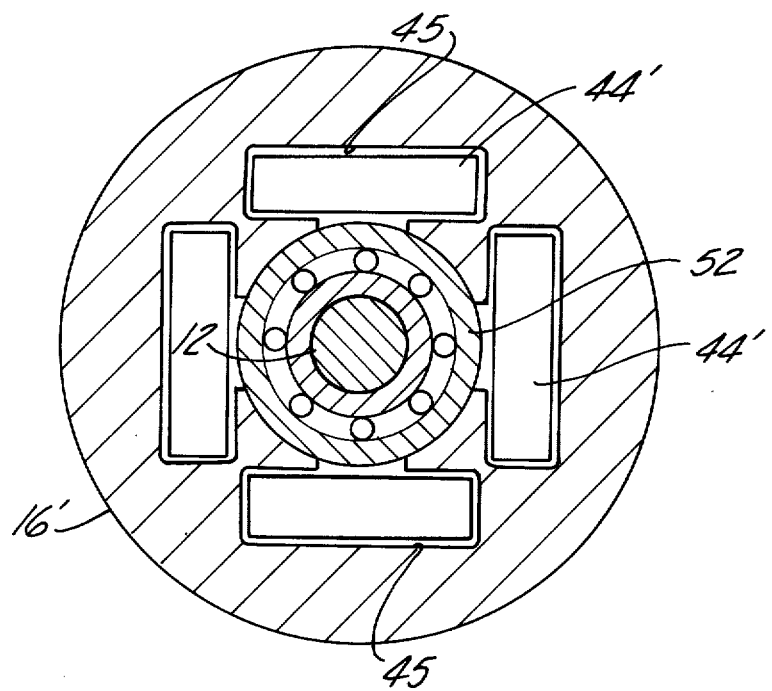
FIG. 2 is a sectional view taken through a second embodiment of the invention.

The bimetal elements can be formed as rings as shown in FIG. 1; alternately such elements can be formed as rectangular strips as shown at 44' in FIG. 2. When the bimetals are formed as rectangular strips or plates it may be necessary to prevent undesired facial shift of the elements resulting from engine induced vibrational forces. Such undesired shifting could presumably be prevented by disposing the bimetal strips in rectangular cavities as shown generally at 45 in FIG. 2. The rectangular cavities would be formed in drive hub 16'; the driven hub would be formed with one continuous annular cavity as shown in FIG. 1 for containment of the clutch plates. The mode of operation of the FIG. 2 device would be generally similar to that of FIG. 1, the essential difference being a possible cost saving in the bimetals due to less scrap when the bimetals are rectangular strips instead of annular rings.

The FIG. 1 drive unit includes four bearings, two of which support the driven hub, and two of which support the drive hub. Needle bearings 48 and ball bearings 50 constitute the support for hub 18. Ball bearing 52 and bushing 54 provide support for hub 16. Bearings 48 and 50 are located in radial planes that are relatively widely spaced in the axial direction. Similarly bearing 52 is in a radial plane that is relatively remote from the radial plane occupied by bushing 54. The support devices are essentially at opposite ends of their respective hubs so that cantilever forces due to unsupported hub sections are minimal or non-existent. The bearing arrangement is designed for proper support of each hub without excessively increasing the axial dimensions of the drive unit.

Other considerations aside, each hub should be free to rotate on shaft 12 without loading or rotating the other hub, except through the thermally energized clutch means. Thus, at low ambient temperatures the drive hub 16 should be rotatable by action of the drive belt without transmitting any appreciable torque or rotation to hub 18. In the illustrated arrangement pulley surface 20 is generally radially aligned with main bearing 52 for hub 16. Belt loadings are therefore transmitted from hub 16 primarily through bearings 52 to shaft 12; bushing 54 is subjected to only minor loads so that hub 18 has little rotation due to friction between bushing 54 and drive hub 16.

The driving unit shown in FIG. 1 is preferably assembled by pressing the bearings onto the respective hubs and shaft, and then retaining the bearings in place with suitable split rings and spacers, designated by numerals 56 and 58 in the drawing. A transverse bar 60 located in an oversize slot 62 in shaft 12 may be employed to adjust the axial location of hub 16 on hub 18. An axial pin 63 connected to a machine screw (not shown) moves bar 60 in the direction of axis 14 to thereby adjust bearing 52 along the shaft 12 surface. In the course of this adjustment hub 16 moves axially relative to hub 18, to thereby vary the spacing between hub end walls 22 and 30. Such an action can be used to calibrate the device against tolerance variations in the plates and hubs. If found desirable, the axial adjustment can provide a full time lock-up between the drive and driven hubs, as after excessive wear of the plates. The adjustment avoids the need for shims or excessively close manufacturing tolerances.

The FIG. 1 drive unit may be slightly larger in the radial and axial dimensions, compared to conventional drive units not having the temperature response feature. However the dimensions are comparable and not overly excessive, since it is believed that the illustrated unit uses space in an economical fashion. The clutch plates and bimetal plates are located in an annular space that is usually non-used except for defining the pulley diameter; the various plates therefore do not appreciably increase the pulley diameter compared to conventional units. The drive hub and driven hub telescope within one another to minimize the axial dimension of the drive unit.

Figure 3:
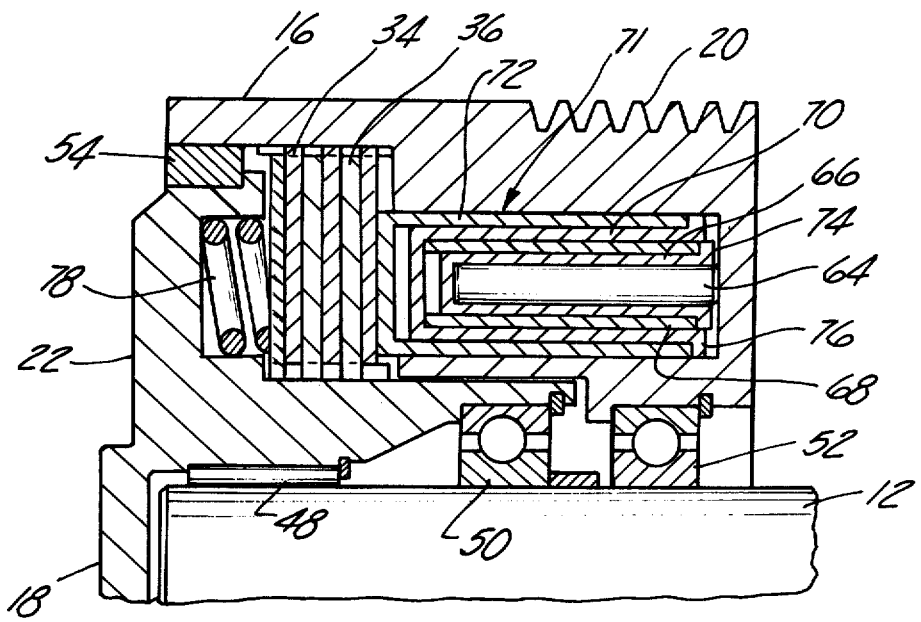
FIG. 3 is a fragmentary sectional view taken through another device incorporating certain features of the invention.

It is believed that some variation in structure and arrangement can be employed while still operating under the teachings of the invention. FIG. 3 illustrates a modification that might be useful. The difference between the FIG. 1 and FIG. 3 units resides in the nature of the thermal power means. As shown in FIG. 3, the thermal power means 71 comprises a series of concentric rods and sleeves formed of dissimilar materials, for example a relatively high expansion material such as brass and a relatively low expansion material such as steel. The rods and sleeves are interconnected to effectively multiply the differential expansion between adjacent ones of the members.

The specific power means 71 shown in the drawing includes a brass rod 64, a steel sleeve 66, a larger brass sleeve 68, a still larger steel sleeve 70, and a yet larger brass sleeve 72. The steel sleeves are provided with flanges 74 and 76 for transmitting axial force to the next larger brass sleeve. The largest sleeve transmits the thermally derived force to the clutch plate assembly.

Figure 4:
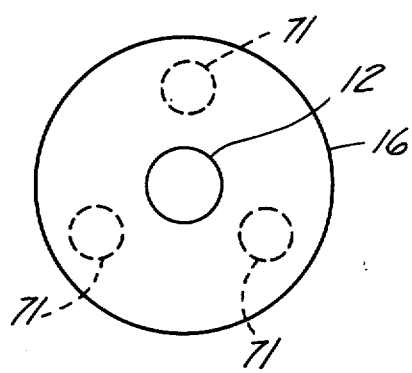
FIG. 4 is a right end view of the FIG. 3 device taken on a reduced scale.

It should be understood that the various sleeves are concentric about rod 64, not about the shaft 12 axis. To provide balanced pressure on the clutch plates a number of rod-sleeve assemblies may be provided. For example, one assembly can be located at the 12 o'clock position, a second similar assembly at the 4 o'clock position, and a third similar assembly at the 8 o'clock position. The general arrangement is shown by FIG. 4.

The axially acting rod-sleeve assembly of FIG. 3 acts as a solid member, not as a spring. Therefore, it is believed that temperature override protection might be necessary to preclude excessive axial stress. The override protection may comprise a number of stiff, high rate compression springs 78 engaged between hub end wall 22 and the clutch plate assembly. At normal operating temperatures each spring is uncompressed; it acts as a solid rod without yielding under the axial loads imposed by the thermal power means. At extremely elevated temperatures the high thermal forces cause the springs to compress to allieviate the excessive stress.

FIGS. 1 and 2 illustrates preferred embodiments of the invention. FIG. 3 shows one modification that might be employed while practicing the invention.

I wish it to be understood that I do not desire to be limited to the exact details of construction shown and described for obvious modifications will occur to a person skilled in the art.

I claim:

1. A temperature responsive drive unit comprising a stationary support shaft; an annular drive hub comprising an outer peripheral side wall concentric with the shaft, and an end wall radiating inwardly from said side wall toward the shaft; a driven hub comprising an inner peripheral side wall encircling the stationary shaft within the space circumscribed by the aforementioned outer peripheral side wall, and a second end wall radiating outwardly from the inner peripheral side wall; thermally-energized clutch means acting axially between the end walls of the drive and driven hubs to transmit a variable drive force from the drive hub to the driven hub; first bearing means between the stationary shaft and the inner peripheral side wall of the driven hub; second bearing means between the shaft and the end wall of the drive hub; and third bearing means between the end wall of the driven hub and the outer peripheral side wall of the drive hub.

2. The drive unit of claim 1: said first bearing means comprising two axially spaced bearings at different points along the shaft.

3. The drive unit of claim 1: the end wall of the driven hub constituting a mounting surface for a fan; a surface area of the drive hub outer peripheral wall in radial alignment with the second bearing means constituting a drive pulley.

4. The drive unit of claim 1: said clutch means comprising first clutch plate means keyed to the outer peripheral side wall of the drive hub, second clutch plate means keyed to the inner peripheral side wall of the driven hub, and thermal power means trained between the end wall of the drive hub and the clutch plate means to develop axial thrust forces thereon.

5. The drive unit of claim 4: said thermal power means comprising a stack of radially extending bimetal plates.

6. The drive unit of claim 1: and further comprising axial force means operable on the second bearing means to move the drive hub bodily along the shaft for calibrating the clutch means.

* * * * *